Figure 1:
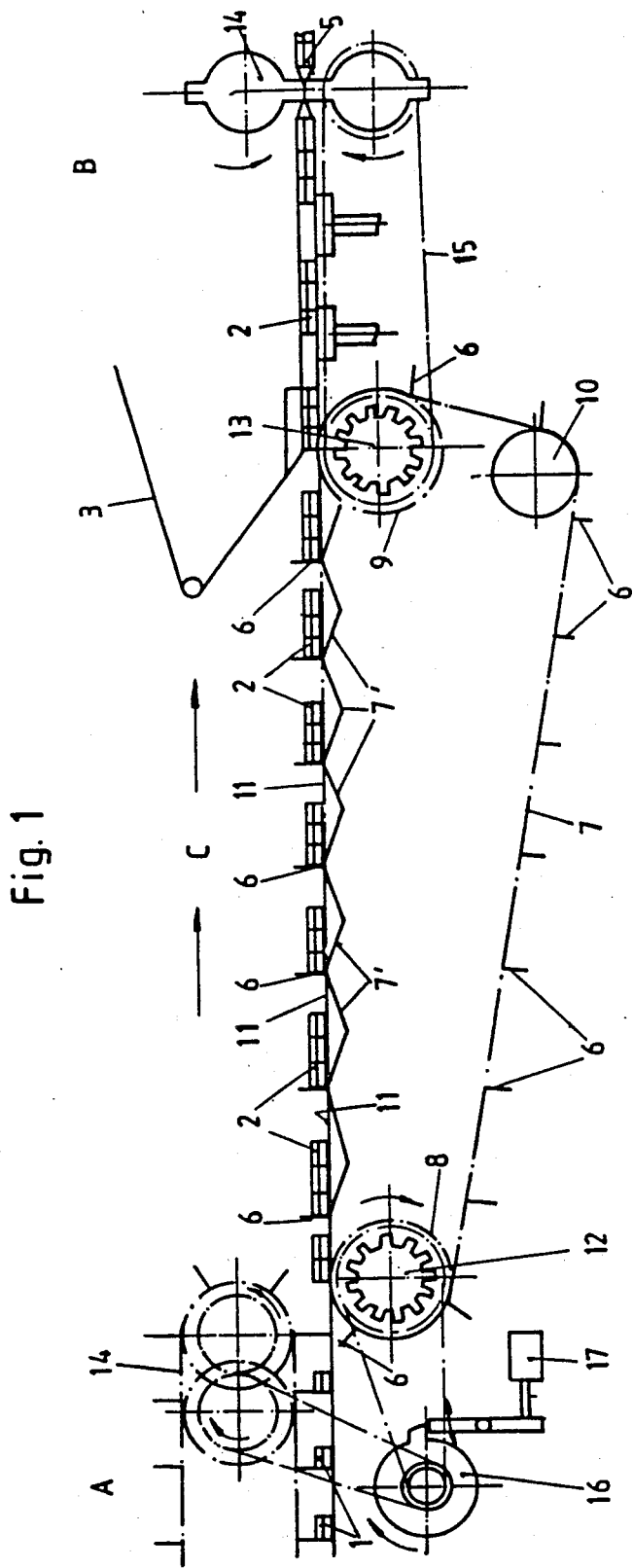

United States Patent [19]

Hogenkamp

[11] Patent Number: 4,660,350
[45] Date of Patent: Apr. 28, 1987

[54] DEVICE FOR SYNCHRONIZING A SERIES OF PACKAGING MACHINES POSITIONED ALONG A CHAIN CONVEYOR, ESPECIALLY IN THE CONFECTIONS INDUSTRY

[75] Inventor: Wilhelm Hogenkamp, Hanover, Fed. Rep. of Germany

[73] Assignee: Firma Otto Hänsel GmbH, Hanover, Fed. Rep. of Germany

[21] Appl. No.: 805,472

[22] PCT Filed: Apr. 30, 1985

[86] PCT No.: PCT/EP85/00191
§ 371 Date: Nov. 15, 1985
§ 102(e) Date: Nov. 15, 1985

[87] PCT Pub. No.: WO85/05089
PCT Pub. Date: Nov. 21, 1985

[30] Foreign Application Priority Data
Apr. 30, 1984 [DE] Fed. Rep. of Germany ....... 3416012

[51] Int. Cl.[4] .............................................. B65B 57/00
[52] U.S. Cl. ........................................ 53/52; 198/347; 198/572

[58] Field of Search ................. 53/51, 52, 55, 493, 53/494, 550, 450; 198/347, 581, 588, 572, 575, 576

[56] References Cited
U.S. PATENT DOCUMENTS

| 3,797,635 | 3/1974 | Boisen et al. | 198/572 |
| 3,814,232 | 6/1974 | Eriksson | 198/572 X |
| 4,507,908 | 4/1985 | Seragnoli | 198/572 X |
| 4,514,963 | 5/1985 | Bruno | 198/572 X |
| 4,570,783 | 2/1986 | Newcom et al. | 198/347 |

Primary Examiner—Horace M. Culver
Attorney, Agent, or Firm—Max Fogiel

[57] ABSTRACT

The invention concerns a device for synchronizing a series of packaging machines positioned along a chain conveyor, expecially in the confections industry, that is intended for use when articles are to be packaged individually in one packaging machine and supplied to a downstream packaging machine for packaging as a set, characterized in that a chain-and-pusher buffer is interposed in the chain-conveyor section (C) connecting two (A & B) of the packaging machines and carrying the pushers (6) for the individually packaged articles (1) and in that each packaging machine (A & B) has its own chain-drive mechanism (8 and 9 respectively), both of which are connected to one set of electronic controls that carry out the synchronization.

4 Claims, 2 Drawing Figures

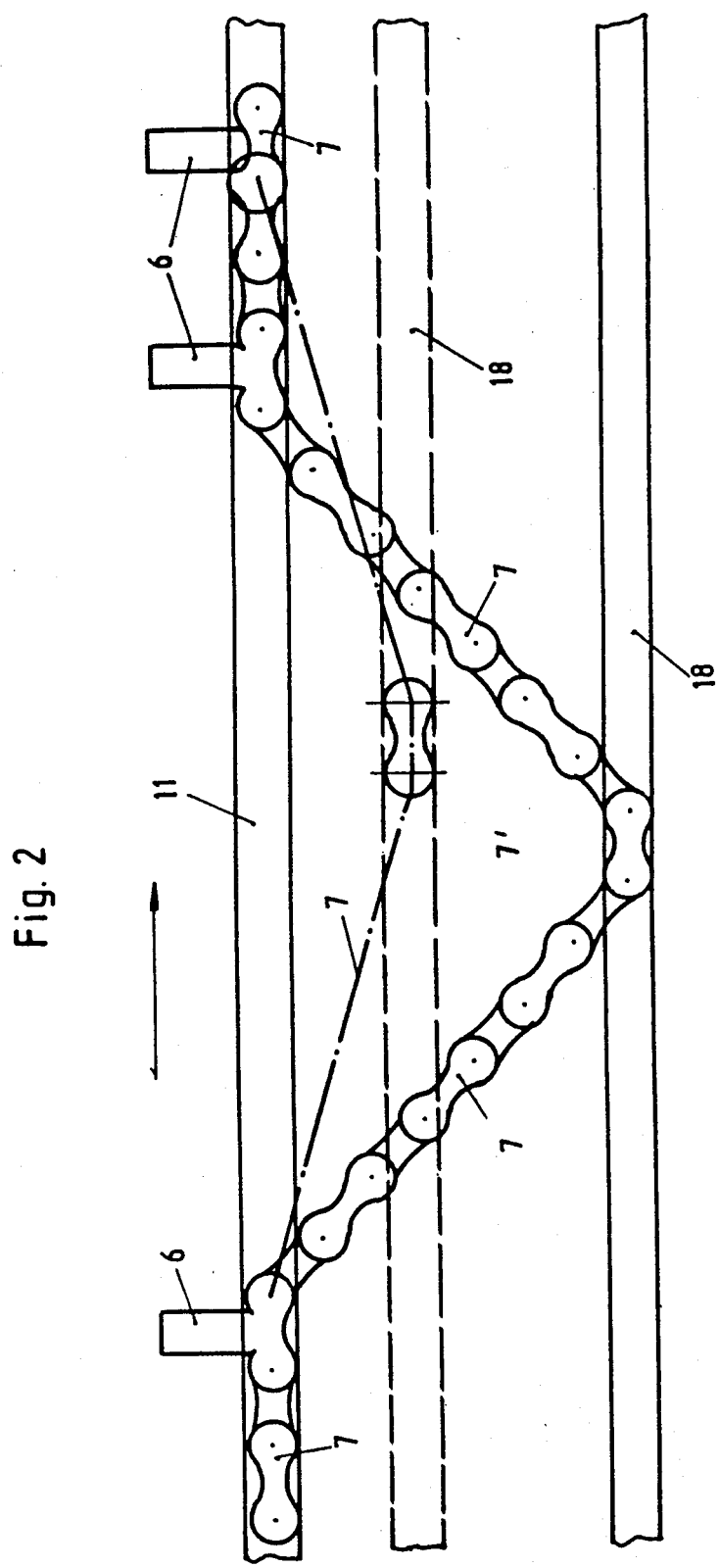

DEVICE FOR SYNCHRONIZING A SERIES OF PACKAGING MACHINES POSITIONED ALONG A CHAIN CONVEYOR, ESPECIALLY IN THE CONFECTIONS INDUSTRY

The invention concerns a device for synchronizing a series of packaging machines positioned along a chain conveyor, especially in the confections industry, that is intended for use when articles are to be packaged individually in one packaging machine and supplied to a downstream packaging machine for packaging as a set. The articles packaged individually in the first machine have always been assembled together on a conveyor belt and a specific quantity at a time supplied therefrom to the set-packaging machine by means of an inserter, with the throughput of the set-packaging machine depending on the capacity of the belt between the two machines and necessitating careful monitoring. This has a very deleterious effect on the throughputs of each machine. Furthermore, this method of processing can only be used with articles that collide on the belt and can withstand the resulting impact.

The object of the present invention is to eliminate this restriction and to provide a device for synchronizing a series of packaging machines positioned along a chain conveyor, especially in the confections industry, in which the synchronization of the series of machines is completely automatic and continuous, with the articles to be packaged subjected to no stress and without the operation of the packaging line being disrupted.

This object is attained in accordance with the invention in that a chain-and-pusher buffer is interposed in the chain-conveyor section connecting two of the packaging machines and carrying the pushers for the individually packaged articles and in that each packaging machine has its own chain-drive mechanism, both of which are connected to one set of electronic controls that carry out the synchronization.

The pushers for the articles to be packaged are positioned at intervals along the chain conveyor and are in accordance with the invention accommodated in a stationary channel that connects both packaging machines, the conveyor is allowed to form a sag between each pair of pushers in the vicinity of the channel, and there is a rotating mechanism, which drives the conveyor, at the outtake end of one packaging machine and at the intake end of the other packaging machine, both mechanisms being connected to the electronic controls that carry out the synchronization.

The sags in the chain conveyor, which travels with its pushers along the stationary channel, are preferably supported on a channel that parallels the conveyor and can be shifted transversely with respect to the stationary channel. The degree of sag in the conveyor and its arrival in the set-packaging machine can be varied in relation to operating conditions by raising or lowering the adjustable channel.

The rotating mechanism associated with the first packaging machine is controlled by a device that monitors the loading of the chain conveyor and synchronized with the rotating mechanism associated with the second packaging machine in such a way that both mechanisms contribute to advancing the conveyor, and the synchronization system regulates the throughput of the second machine appropriately when the speed of the first rotating mechanism changes.

The theory behind the invention allows for a very wide range of embodiments, one of which is illustrated in the attached drawings.

FIG. 1 is a schematic illustration of a packaging line consisting of a series of two packaging machines and FIG. 2 is a larger scale detail illustrating how the chain conveyor operates.

Two packaging machines are positioned in series along a worm conveyor 6 as illustrated in FIG. 1. Machine A, the master, produces individually packaged articles 1 for assembly into packaging sets 2, each consisting for example of three individually packaged articles 1, each set to be introduced into a separate wrapper. This is the function of Machine B, the slave, which is a tubular-sacking machine that places three individually packaged articles 1 at a time for instance in a tubular sack of plastic sheet. The plastic sheet travels in a web 3 that is sealed between each pair of packaging sets 2 and separated, with ready-to-ship packages 5 leaving the machine.

Section C of the line consists of a chain conveyor 7 with pushers 6 that travels over pulleys 8, 9, and 10. Conveyor 7 is longer than the actual conveyor line, in which it is supported on its pushers 6 on a stationary channel 11. It is long enough to allow sags 7', the significance of which will be described later herein, to occur between pushers 6 in the vicinity of channel 11.

Chain conveyor 7 is driven by rotators 12 and 13 in the vicinity of packaging machines A and B respectively.

Chain conveyor 7 is supplied with individually packaged articles 1 by a loading chain 14 that also has carriers and that transfers the articles individually to channel 11, where they are accepted and transported by the pushers 6 on chain conveyor 7.

At the end of chain-conveyor section C is another chain or belt conveyor 15 or similar mechanism that accepts packaging sets 2 and introduces them into tubular-sack packaging machine B.

In the vicinity of the rotator 12 associated with packaging machine A is a one-stop clutch 16 that is driven by rotator 12 and activated by a magnet 17.

Below channel 11 is another channel 18 that supports and positions sags 7' and can be shifted transversely with respect to channel 11. When, for example, channel 18 is shifted into the position indicated by the broken lines in FIG. 2 the sag or sags 7' will become shorter, increasing the length of chain conveyor 7.

The operation of the device will now be described.

Individually packaged articles 1 arrive on channel 11 from packaging machine A. The throughputs of the individual components are matched in such a way that packaging sets 2, each consisting of three individual articles for instance, are assembled on this section of the conveyor line out of individually packaged articles 1, accepted by the pushers 6 on chain conveyor 7, and supplied to packaging machine B. The individually packaged articles can for example be squares or bars of chocolate, Neapolitans, pralines, cookies, or other types of confectioneries, which leave packaging machine B in packages of three.

If an individually packaged article 1 is missing from chain conveyor 7 for any reason, the throughput of packaging machine B will be modified by electronic controls that are not illustrated in detail. The drive mechanism 12 of rotator 8 must precisely correspond quantitatively to one interval of chain conveyor 7. The conveyor must always continue moving in the vicinity of the chain-conveyor section. Since sags 7' provide it with longitudinal compensation, when there is a malfunction on the part of packaging machine A or in loading chain conveyor 7 with the requisite number of individually packaged articles 1 for a packaging set 2, chain conveyor 7 can continue into tubular-sack packaging machine B but will be extended due to the corresponding resolution of sags 7'. Rotator 8 will on the other hand shut down during such a malfunction due to activation of one-stop clutch 16 by magnet 17. Other electronic controls, not illustrated, will convert the brief shutdown of rotator 8 into a corresponding continuous deceleration of rotator 9 to equalize the different number pulses in rotators 8 and 9.

If a series of too many articles for the length of the conveyor is missing, the mechanism that drives packaging machine A or rotator 8 will shut down, whereas chain conveyor 7 will continue to advance. Once articles begin to be supplied from packaging machine A again, one-stop clutch 16 and 17 will turn rotator 8 on again and the mechanism that drives rotator 9 will accelerated in accordance with the difference in pulses. When the speed of packaging machine A is regulated, the throughput of packaging machine B will be adjusted by the synchronization device.

I claim:

1. An arrangement for synchronizing a series of packaging machines positioned along a chain conveyor, comprising: a first packaging machine for packaging articles individually; a second packaging machine positioned downstream from said first machine and receiving packaged articles from said first machine for packaging the articles as a set; a chain conveyor with a section between said first machine and said second machine; a chain-and-pusher buffer interposed in said section of said chain conveyor; pushers carried by said section of said chain conveyor for individually packaged articles; chain-drive means on each of said first machine and said second machine; both said chain-drive means being controllable for synchronizing said packaging machines.

2. An arrangement for synchronizing a series of packaging machines positioned along a chain conveyor, comprising: a chain conveyor; pushers for articles to be packaged positioned at intervals along said chain conveyor; at least two packaging machines; a stationary channel connecting said two packaging machines and accommodating said pushers; asid conveyor having a sag between each pair of pushers in vicinity of said channel; first rotational driving means for driving said conveyor at the exit end of one packaging machine; second rotational driving means for driving said conveyor at the inlet end of the other packaging machine; said first driving means and said second driving means being controllable for carrying out synchronization.

3. An arrangement as defined in claim 2, including an auxiliary channel parallel to said conveyor and shiftable transversely with respect to said stationary channel, sags in said chain conveyor traveling with corresponding pushers along said stationary channel being supported on said auxiliary channel.

4. An arrangement as defined in claim 2, wherein said first rotational driving means is controllable dependent on loading of said chain conveyor and synchronized with said second rotational driving means so that both driving means contribute to advancing the conveyor, synchronization of said two driving means regulating throughput of said other packaging machine dependent on changes in speed of said first rotational driving means.

* * * * *